United States Patent [19]

Brower

[11] Patent Number: 4,897,011

[45] Date of Patent: Jan. 30, 1990

[54] MECHANICAL LIFT DEVICE

[76] Inventor: Rupard A. Brower, 3521 NW. Hermosa Dr., Kansas City, Mo. 64150

[21] Appl. No.: 218,584

[22] Filed: Jul. 12, 1988

[51] Int. Cl.[4] ............ B60B 29/00

[52] U.S. Cl. ............ 414/459; 254/2 R

[58] Field of Search ............ 414/458, 459, 460, 461, 414/391, 429, 427; 254/7 R, 7 B, 4 R, 4 B, 8 R, 8 B, 45, 47, 89 R, 2 R, 2 C

[56] References Cited

U.S. PATENT DOCUMENTS 3,702,139 11/1972 Chaffin ............ 414/458
3,831,791 8/1974 Gonzales ............ 254/4 R
3,881,689 5/1975 Bury et al. ............ 254/45
4,306,707 12/1981 Roscoe ............ 254/47
4,491,452 1/1985 Matovich ............ 254/4 R

*Primary Examiner*—Robert C. Watson
*Attorney, Agent, or Firm*—Kokjer, Kircher, Bradley, Wharton, Bowman & Johnson

[57] ABSTRACT

A mechanical lifting device is the subject of the present invention. The device includes a framework which may be easily collapsed or assembled and comprises a plurality of tubular pieces which are held in place by bolts utilized as set screws. Two upright spaced apart frame sections support two spaced apart support bars and a gear rack and lever are employed to effect movement of the support bars. A platform may be mounted on the support bars to provide a scaffold. The platform may also be removed and the support bars positioned over a load to lift it straight upwardly.

9 Claims, 2 Drawing Sheets

MECHANICAL LIFT DEVICE

This invention relates generally to mechanical lift devices and, more particularly, to a device which is able to lift heavy objects of varying size and shape from different positions.

Various types of lifting devices are well known in the prior art and include hoists, jacks, scaffolds and platform mechanisms. Most of the overhead type lifting devices of the prior art as well as the platform lifting devices are designed for commercial usage and are prohibitively expensive for the average homeowner. The prior art devices typically utilize electrical or hydraulic hoists which perform adequately, but also contribute significantly to the cost of the item.

Another disadvantage of the prior art lifting devices is that they are designed to perform only one particular lifting function. For example, an overhead hoist is generally not designed to also serve as a lifting platform and may be designed to exert a lifting force only from one particular overhead position.

It is, therefore, a primary object of the present invention to provide a mechanical lifting device which is adaptable to lift heavy loads to different heights and is actuated solely by mechanical means thereby making the device economical for consumers generally.

Another one of the objects of this invention is to provide a lifting device which can be used as an overhead hoist or alternatively as a lifting platform.

As a corollary to the foregoing object, an important aim of my invention is to provide a device which is capable of lifting tool boxes or other heavy objects from inside of a truck bed or other container.

Another object of the invention is to provide a lifting device meeting the aims and objects heretofore set forth which is capable of lifting loads of various sizes and shapes.

It is another one of the objectives of the invention to provide a lifting device which can serve as an overhead hoist and to which loads may be attached at different positions along a horizontal plane.

Still another important aim of my invention is to provide a lifting device meeting the aims and objects heretofore set forth which can be easily collapsed for storage and transport.

Other objects of the invention will be made clear or become apparent from the following description and claims when read in light of the accompanying drawing, wherein:

Figures 1, 2:
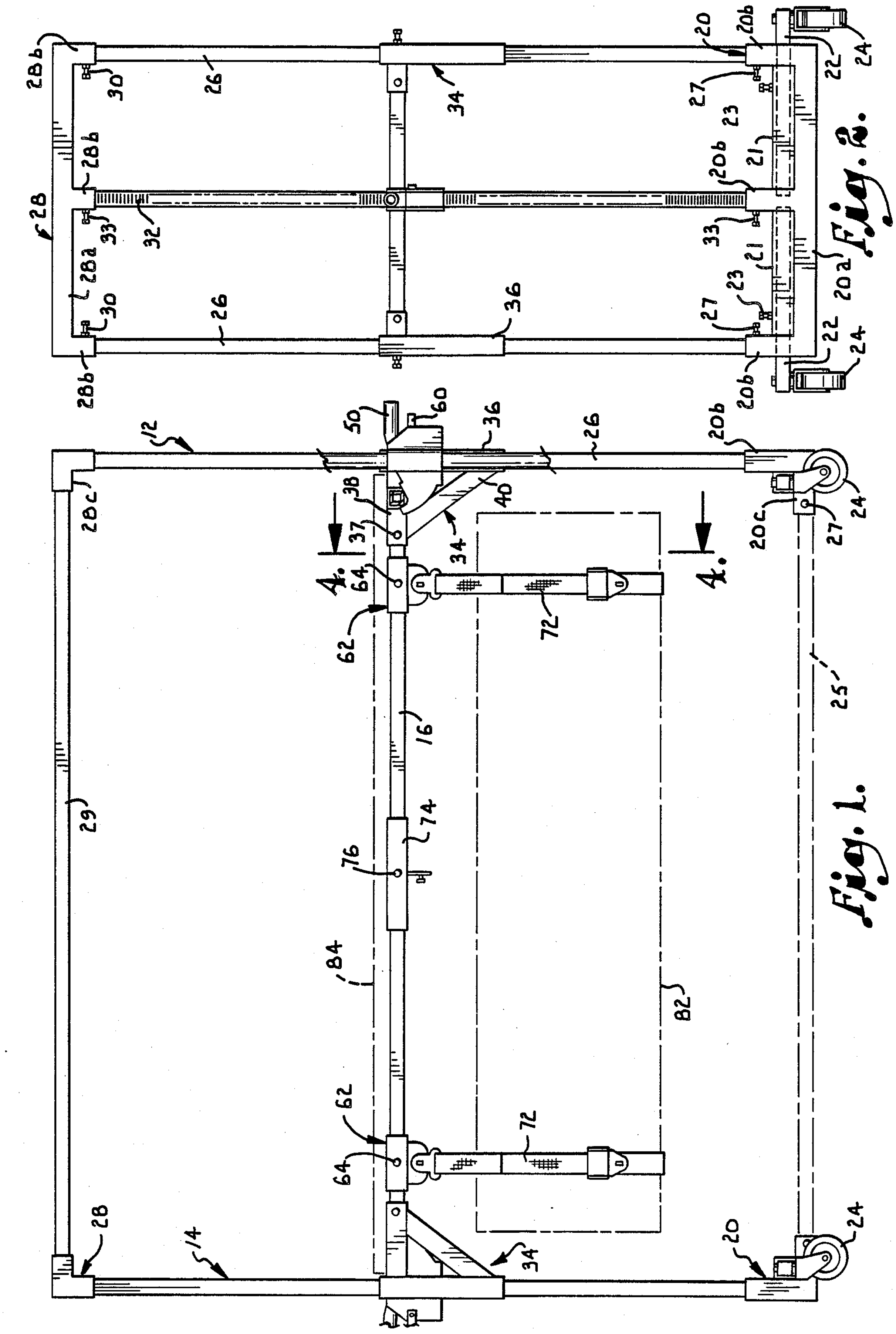
FIG. 1 is a front elevational view of the lifting device of the present invention.
FIG. 2 is an elevational view of one end of the device.
Figure 3:
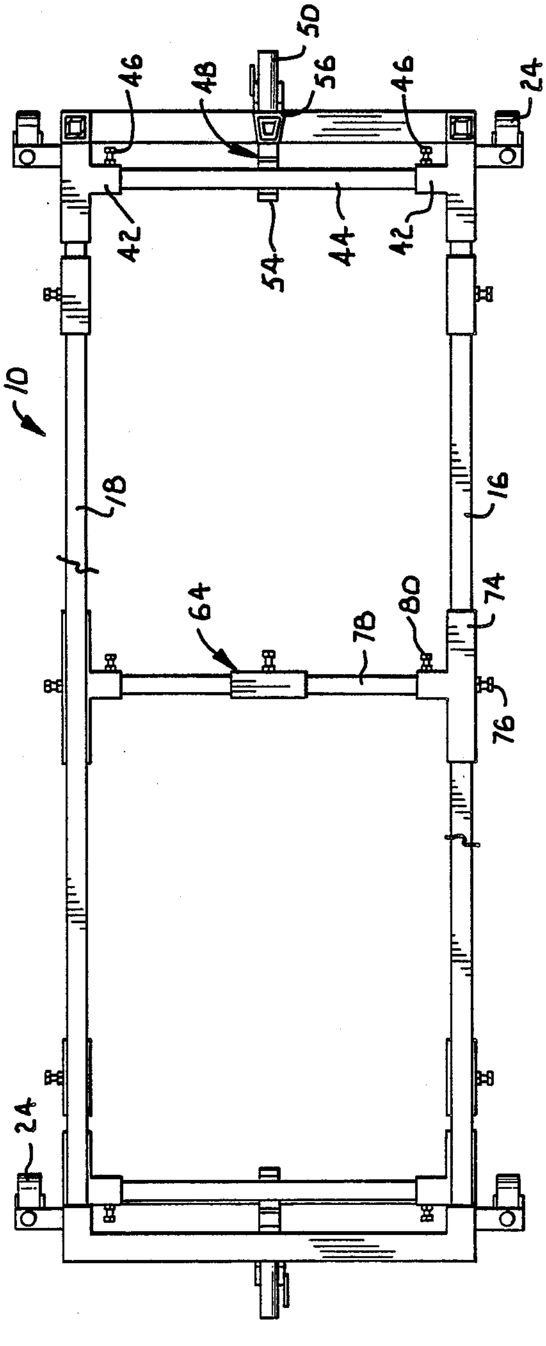
FIG. 3 is a top plan view of the lifting device according to the present invention.

Referring initially to FIGS. 1–3, the lifting device of the present invention is designated generally by the numeral 10 and includes first and second opposed upright frame sections 12 and 14. First and second load carrying support bars 16 and 18 are coupled with frame sections 12 and 14 as will be more fully described hereinafter.

Each of the two frame sections 12 and 14 is identical and, accordingly, only the frame section 12 will be described in detail, although like reference numerals have been placed on both of the frame sections to provide a more complete understanding of the drawings. Frame section 12 includes a base bracket 20 which includes a horizontal tubular component **20*a* and three spaced apart upright tubular sleeves 20*b*. A second horizontal tubular component 20*c* which extends at a right angle to component 20*a* receives a horizontal stabilizer bar 25 located below load carrying support bars 16 and 18. Bar 25 is held within horizontal component 20*c* by bolt 27. Horizontal tubular member 21 is rigidly secured to base bracket 20 and telescopically receives outrigger bars 22 which are movable relative to the tubular member 21 and are held in place by bolts 23. Each bar 22 mounts a caster wheel 24**.

Frame section 12 further includes two spaced apart upright support stanchions 26 one end of each stanchion being received in the two endmost vertical tubular components **20*b* of the base bracket. Stanchions 26 are retained within components 20*b* and held rigid by bolts 27 mounted on one side of each vertical component 20*b*. A top bracket 28 includes horizontal component 28*a* and vertically disposed downwardly facing tubular components 28*b*. A second horizontal component 28*c* extends at a right angle to the first horizontal component 20*a* and mounts a stabilizer bar 29 that is positioned above load support bars 16 and 18. Tubular components 28*b* receive the top ends of stanchions 26 which are held in place by bolts 30. Also disposed between top bracket 28 and base bracket 20 and received within the center vertical tubular components 20*b* and 28*b* is a toothed rack 32 which is held in place by bolts 33** coupled with the respective vertical tubular sections.

Each load carrying support bar 16 and 18 is coupled with frame sections 12 and 14 by coupling brackets 34 which will now be described in detail. Each coupling bracket 34 includes two tubular sections 36 and 38 which are joined together at a right angle to form an "L". Tubular section 36 is telescopically received by an upright stanchion 26 and tubular section 38 telescopically receives a support bar 16 which is held in place by a bolt 37. A brace leg 40 extends between tubular sections 36 and 38. Extending at a 90° angle to both of sections 36 and 38 is a horizontal coupling section 42 which receives one end of a coupling bar 44, the other end of which is received by a like coupling section 42 on an adjacent coupling bracket 34. A bolt 46 extends through coupling section 42 to hold coupling bar 44 in place.

Telescopically mounted on each gear rack 32 is a lifting mechanism designated generally by the numeral 48. Mechanism 48 is a lever type jacking mechanism of the type commonly utilized with automobile bumper jacks and well known to those skilled in the art. Mechanism 48 includes a tubular lever receptacle 50, a box frame 52 and a lifting arm 54. A tubular sleeve 56 mounts the mechanism in movable relationship to gear rack 32. Lever receptacle 50 is coupled with a spring biased cog 58 and when the receptacle 50 is forced downwardly cog 50 will engage gear rack 32 to raise support bars 16 and 18 as a result of the force applied through lifting arm 54 and coupling bar 44. The action of the lifting mechanism may be reversed by moving lever 60 to its downwardly position. This will cause the mechanism to move down one notch each time lever 50 is forced downwardly.

Figure 6:
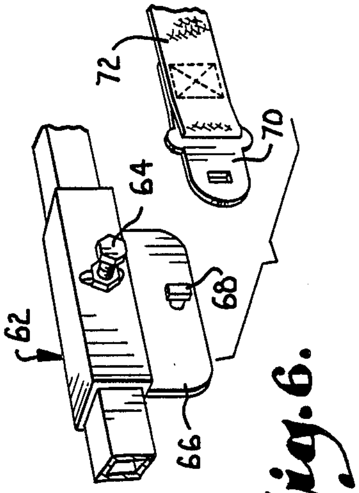
FIG. 6 is an enlarged fragmentary view of the load supporting means utilized in the alternative embodiment of the invention shown in FIG. 5.

As shown in FIGS. 1, 3 and 6, each support bar 16 and 18 is provided with two movable load couplers 62 each of which is telescopically received by one of the bars and is movable over the length of the bar. Each coupler 62 may be locked in a given position along its bar by a bolt 64. As best seen from viewing FIG. 6, each coupler 62 includes a depending wall 66 from which a projecting hook 68 extends. Hook 68 receives a rigid tongue 70 coupled with a strap 72.

Disposed midway along the length of each bar 16 and 18 is a T-coupling 74 which is movable relative to the bar and may be held in any given position by bolt 76. The T-coupling 74 also receives a cross brace 78 (FIG. 3) which is held in place by a bolt 80. Another load coupler 62 is slidably mounted on the cross brace 78.

In operation, the lifting device 10 is first positioned relative to a load to be lifted and outriggers 22 are moved to an appropriate width to provide necessary stabilization for the device. When the device is to be positioned over a load such as, for example, a tool box in the bed of a truck, optional stabilizer bar 25 is not utilized so as not to interfere with moving of the device over the load. Straps 72 are placed around the load such as tool box 82 schematically illustrated in FIG. 1. A handle (not shown) is then inserted into lever receptacle 50 of each of the two lifting mechanisms and the handle moved through an arc of approximately 60° so as to move support bars 16 and 18 upwardly and thereby lift the load. When the load has been moved to its desired location, lever 60 is moved to reverse the direction of the lifting mechanism so that the load may be lowered by moving the handles received by lever receptacles 50 through their operating arc.

Support bars 16 and 18 may also be utilized to mount a platform 84 (FIG. 1) so as to transform device 10 into a scaffold for supporting one or more persons working at elevated locations. In this particular application, it may be desirable to include stabilizer bar 25 so as to provide increased stability and safety to the workers on platform 84. Lifting and lowering of the mechanism is effected in the same manner as previously described.

Figure 4:
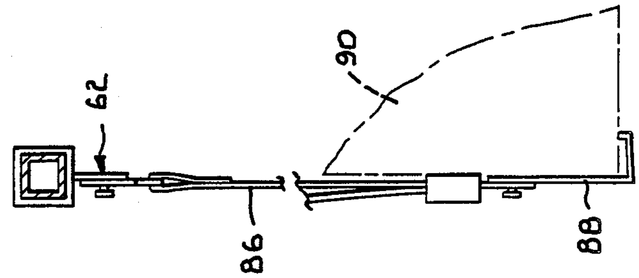
FIG. 4 is a fragmentary vertical cross-sectional view taken along 4—4 of FIG. 1.

An alternative form of the invention is shown in FIG. 4 where straps 86 are coupled with couplers 62 and each strap is provided with an L-shaped lifting arm 88 which may be positioned under a load 90. Operation of the alternative form of the device is the same as previously described.

Figure 5:
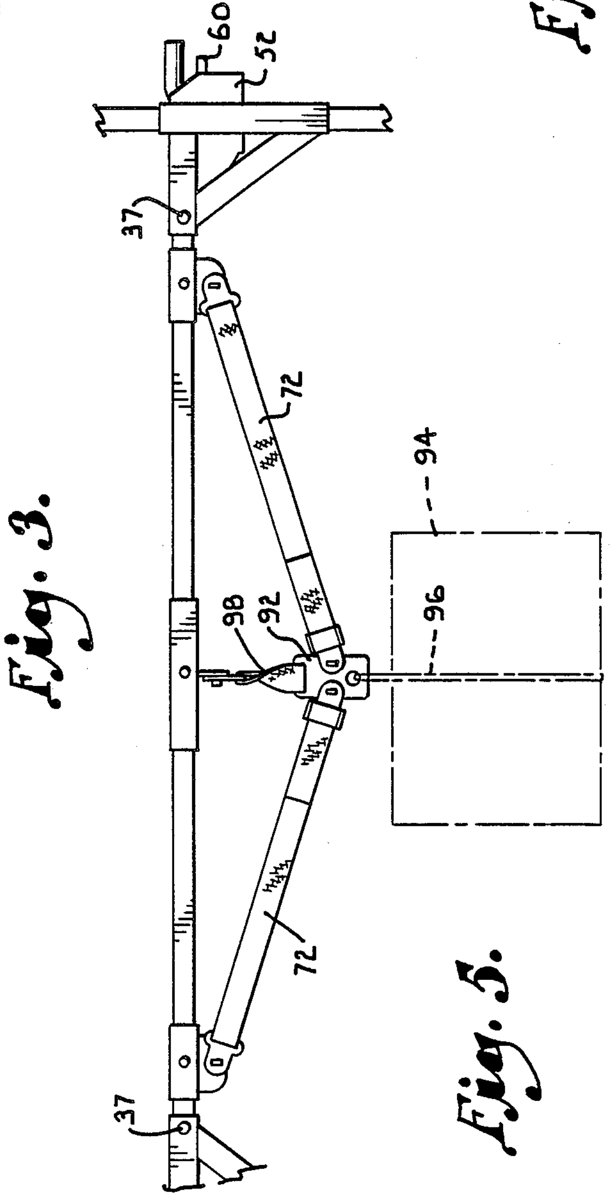
FIG. 5 is a fragmentary front elevational view of an alternative of the invention.

Another alternative form of the invention is shown in FIG. 5 wherein a connector plate 92 is employed to couple the two straps 72 together and a load 94 is supported by a rope 96 which passes through plate 92. In this form of the invention, a third strap 98 is also joined to plate 92 and is suspended from coupler 62 in the center between support bars 16 and 18. Again, operation of the device is the same as described for the previous embodiments.

I claim:

1. Apparatus for lifting and supporting heavy loads, said apparatus comprising:

first and second spaced apart frame sections each including a pair of upright stanchions spaced apart from one another and a center upright located between said stanchions;

a substantially horizontal lifting frame having a pair of spaced apart load carrying bars and a pair of coupling bars extending between and connecting said load carrying bars;

a guide sleeve fitted on each upright stanchion for sliding movement up and down thereon, said sleeves being rigidly coupled with said lifting frame to guide the latter up and down on said frame sections;

a pair of mechanical jacks mounted on the respective center uprights and movable up and down thereon by jacking action, said jacks being rigidly coupled with the respective coupling bars of said lifting frame to raise and lower the lifting frame by jacking action upon operation of said jacks; and means for coupling the load with said lifting frame.

2. Apparatus as set forth in claim 1, wherein:

said lifting frame includes a transverse bar extending between said load carrying bars at a location between said coupling bars; and said transverse bar carries thereon a coupler by which the load may be coupled with said transverse bar.

3. Apparatus as set forth in claim 2, including means for coupling said transverse bar with said load carrying bars in a manner permitting the transverse bar to be adjusted in position lengthwise on said load carrying bars.

4. Apparatus as set forth in claim 3, including means for mounting said coupler on said transverse bar in a manner allowing the coupler to be adjusted in position lengthwise on said transverse bar.

5. Apparatus as set forth in claim 2, including means for mounting said coupler on said transverse bar in a manner allowing the coupler to be adjusted in position lengthwise on said transverse bar.

6. Apparatus as set forth in claim 1, wherein said coupling means comprises at least one coupler on each load carrying bar mounted thereon for lengthwise adjustment on the load carrying bar.

7. Apparatus as set forth in claim 1, wherein each frame section includes a pair of rigid brackets connecting the stanchions and center upright of the frame section at respective locations above and below said lifting frame.

8. Apparatus as set forth in claim 7, including:

a pair of top stabilizer bars extending between and rigidly connecting respective pairs of the stanchions in the opposing frame sections at a location above the lifting frame; and a pair of bottom stabilizer bars extending between and rigidly connecting respective pairs of the stanchions in the opposing frame sections at a location below the lifting frame.

9. Apparatus as set forth in claim 1 including:

a pair of top stabilizer bars extending between and rigidly connecting respective pairs of the stanchions in the opposing frame sections at a location above the lifting frame; and a pair of bottom stabilizer bars extending between and rigidly connecting respective pairs of the stanchions in the opposing frame sections at a location below the lifting frame.

* * * * *